United States Patent [19]

Rackliffe et al.

[11] 4,055,993

[45] Nov. 1, 1977

[54] SUB-CYCLIC MEASUREMENT OF SPEED OF AN INTERNAL COMBUSTION ENGINE

[75] Inventors: Richard J. Rackliffe, Agawam, Mass.; Lee R. Armstrong, Enfield, Conn.

[73] Assignee: United Technologies Corporation, Hartford, Conn.

[21] Appl. No.: 684,220

[22] Filed: May 7, 1976

[51] Int. Cl.² .................. G01P 3/48; G01M 15/00
[52] U.S. Cl. ................. 73/116; 235/92 TF; 324/173
[58] Field of Search .......... 73/116, 117.2, 117.3, 73/118; 235/92 CA, 92 GE, 92 MP, 92 FQ, 92 TC, 92 TF, 150.2, 151.3; 324/173

[56] References Cited

U.S. PATENT DOCUMENTS

| | | | |
|---|---|---|---|
| 3,859,512 | 1/1975 | Ritzinger | 235/92 TF |
| 3,870,869 | 3/1975 | Eberle et al. | 235/92 FQ |
| 3,896,377 | 7/1975 | Richardson | 235/92 MP |
| 3,955,135 | 5/1976 | Fastaia | 73/117.3 |

Primary Examiner—James J. Gill
Attorney, Agent, or Firm—M. P. Williams

[57] ABSTRACT

Indications of speed of an internal combustion engine are derived from an engine member connected to and rotating directly with the crankshaft, such as the teeth on the fly-wheel, so as to provide indications for speed measurements on a sub-cycle basis (that is, many times during each revolution). Sensing of an integral number of subsequent indicia, such as teeth, starts and stops an interval counter, such as a clock, having a frequency much greater than the frequency of indicia sensed, feeding a counter; for each integral number of indicia, the counter provides a manifestation of the time lapse between the indicia, and therefore the time to rotate through the small angular increment of the indicia spacing. The ratio of the integral number, which may be one or many, to the total number, times the ratio of the counter accumulation to the clock frequency, provides a measure of speed in speed dimensions of revolution per unit of time.

5 Claims, 3 Drawing Figures

SUB-CYCLIC MEASUREMENT OF SPEED OF AN INTERNAL COMBUSTION ENGINE

CROSS-REFERENCE TO RELATED APPLICATIONS

Some of the subject matter disclosed herein is disclosed and claimed in a commonly owned copending application filed on even date herewith by Willenbecher et al. Ser. No. 684,217, entitled SUB-CYCLIC MEASUREMENTS OF SPEED AND TIME FOR INTERNAL COMBUSTION ENGINE HORSEPOWER INDICATION; and may be used in conjunction with commonly owned, copending applications of Stick et al., Ser. No. 684,037, entitled DETERMINATION OF NUMBER OF TEETH ON AN INTERNAL COMBUSTION ENGINE FLYWHEEL.

BACKGROUND OF THE INVENTION

1. Field of the Invention

This invention relates to diagnosing internal combustion engines electronically.

2. Description of the Prior Art

The diagnosing of the health of an internal combustion engine, and particularly its dynamic operating characteristics, requires knowledge of engine speed. In the prior art, there are a wide variety of known techniques for measuring speed. Perhaps the best known is the electronic tachometer which utilizes electrical signals from the distributor of a spark-ignition internal combustion engine. Such tachometers are subject to erratic operation due to large electrical noise components in the signals being monitored, and rely on the proper operation of the distributor for accuracy, particularly on a sub-cyclic basis. And, the electrical health of the engine may be the precise problem which is desired to be checked, so the distributor may create faulty speed indications which might confuse the diagnostics involved. In engines which do not utilize a spark ignition, such as diesel engines, it is even more difficult to provide adequate speed indications. For average speed measurements, when only a coarse indication of speed is required (as in the case of operation of the vehicle, or in the case of checking for general low idle or high idle speeds) speed measurements on a cyclic basis (based on one signal per revolution or per cycle of the engine) are adequate. But in certain diagnostic procedures, these are inadequate.

As an example, consider the known technique of measuring acceleration of an engine to provide indications related to torque, when then may be related through speed to horsepower, to provide a general indication of engine health. In one technique known to the art, the engine is allowed to undergo a burst acceleration from a low speed to a high speed, the speed of the engine is monitored, and the elapsed time between the sensing of first and second speeds is measured. The problem in this technique is that the speed measurement is made over an entire engine cycle, so the precise time at which the engine crosses the lower threshold speed and the upper threshold speed, thereby to accurately measure the time interval required for the engine to accelerate from one speed to another, cannot be known. In this technique, interpolation based on the difference between the average speeds sensed over succeeding cycles and the desired threshold speeds is utilized to correct the time increment otherwise measured between cycles which follow the sensing of threshold speeds.

SUMMARY OF THE INVENTION

Objects of the present invention include provision of sub-cyclic speed measurments in internal combustion engines.

According to the present invention, the revolution of the crankshaft of an internal combustion engine through successive equal angles, each of which is a small fraction of a full engine revolution, is directly sensed by sensing means adapted to be disposed in proximity with an engine part having indicia thereon capable of being sensed, said indicia being attached directly to and rotating with the crankshaft, said indicia mutually displaced from one another by said small angle, said sensing means providing a signal for each occurrence of the sensing of said indicia; the signals from the sensing means are utilized to start and stop the counting of time intervals which are minute with respect to the times of occurrence of said sensing signals, said time intervals being the reciprocal of speed of the engine for the fraction of the revolution represented by said small angle. In one embodiment of the invention, the indicia are the teeth on the engine flywheel; but the invention encompasses other indicia, such as optical marks displaced about the periphery of the engine damper.

The present invention provides accurate measurement of the speed of a rotating internal combustion engine because it utilizes indicia (displaced by a fixed finite fraction of a revolution) to control counting of time interval signals which can be minutely subdivided to whatever degree is desired for the degree of accuracy required, rather than utilizing fixed time intervals to sense the position of the indicia or the number of indicia which have passed a particular point on the engine. The invention, by utilizing indicia spaced by equal angular displacements that are but a very small fraction of the revolution of the engine, together with even smaller time increments, permits measurement of speed on a sub-cyclic basis to provide a speed profile of the engine, so that even sub-cyclic indications of speed, including variations in speed due to compression and combustion, can be monitored.

The foregoing and other objects, features and advantages of the present invention will become more apparent in the light of the following detailed description of a prefered embodiment thereof, as illustrated in the accompanying drawing.

DESCRIPTION OF THE PREFERRED EMBODIMENTS

Figure 1:
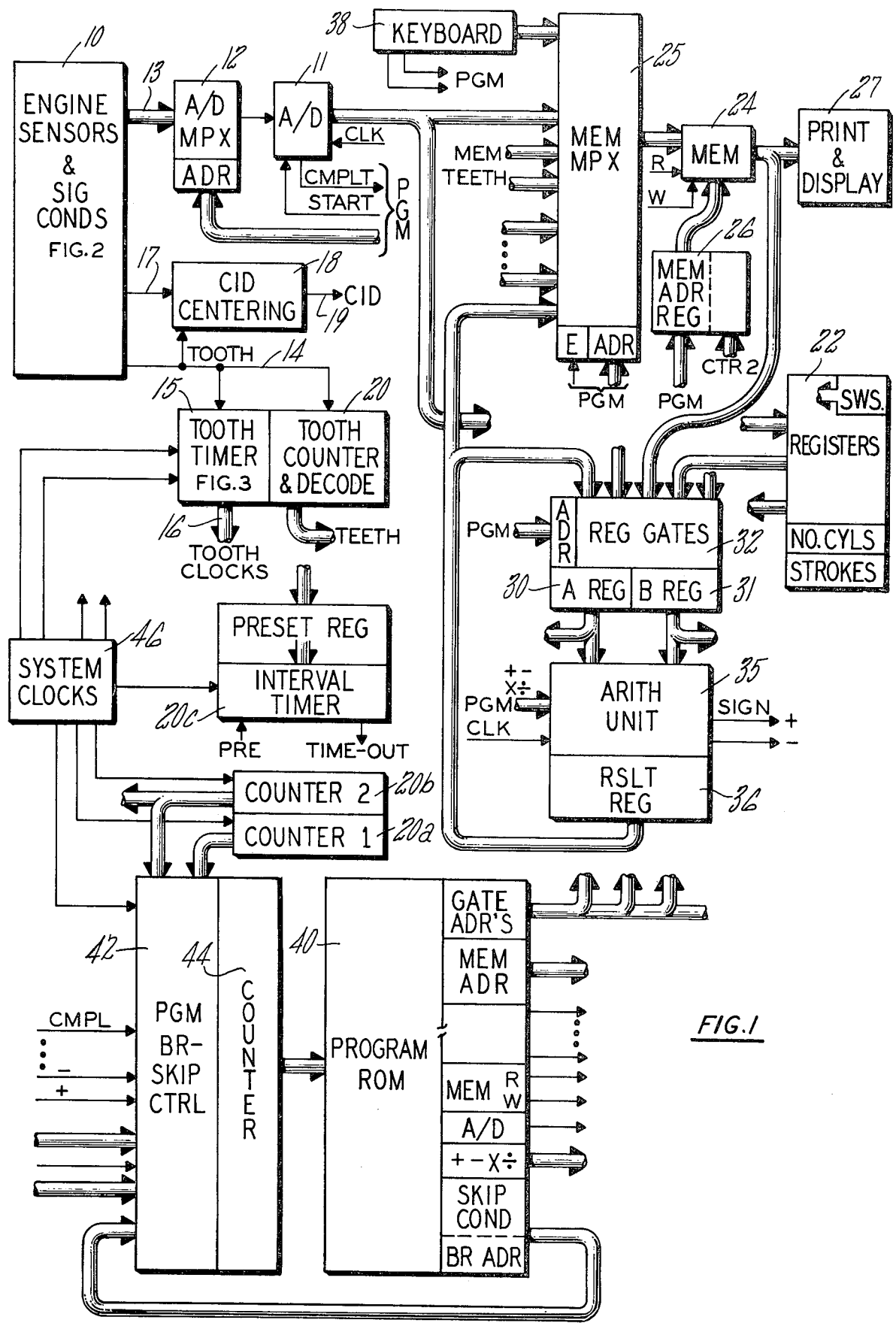
FIG. 1 is a simplified schematic block diagram of a diagnostic system including engine parameter sensing apparatus and exemplary electronic processing apparatus, in which the present invention may be incorporated.

Referring now to FIG. 1, a system which may incorporate the present invention is illustrated as representing the architecture of a typical data processing system or computer together with special purpose apparatus related to an engine diagnostic system of the type in which the invention may be incorporated. Specifically, the system incorporates engine sensors and signal conditioners 10 of a well known type which are adapted to be disposed for response to various parameters or discrete conditions on an engine under test, as described more fully hereinafter. Some of the sensors relate to pressures, temperatures and the like and are therefore analog signals, the magnitude of which is a measure of the parameter being sensed. The outputs of the sensors are fed over lines 13 to an analog to digital converter (A/D) 11 when selected by an A/D multiplexer 12 in response to a particular sensor address applied thereto by the program of the data processor. In additon, a tooth sensor may sense the passage of teeth on the flywheel of the engine to provide a tooth signal on a line 14, the inter-tooth time interval of which (when the engine is running) is measured by a tooth timer 15 and provided on tooth count lines 16. Another discrete signal is a cylinder or cycle identification signal (CID) on a line 17 which is applied to a CID centering circuit 18 to provide a CID signal on a line 19. The raw CID signal on the line 17 is a signal from a proximity sensor disposed to sense movement of an engine member once in each cycle of the engine, such as the rocker arm for the intake valve of one of the cylinders or a cam, if desired; this provides information of the cylinder-by-cylinder position of the engine at any moment in time in the same fashion as the number one firing in a spark ignition engine, and also provides cycle-to-cycle division of the engine's angular position at it is running or cranking.

In accordance with the invention, the parameters of the engine as provided through the A/D converter 11, and the instantaneous position information with respect to the engine as provided by the CID signal on the line 17 and the tooth signals on the line 14 may be used in diagnosis of the engine in accordance with the invention herein.

Additional special apparatus which may be used (although as described hereinafter is not necessarily required) includes a tooth counter and decode circuit 20, and a pair of counters 20a, 20b referred to as counter 1 and counter 2, and an interval timer 20c, and special purpose registers 22, which may be used (as an alternative to memory) to retain certain factors that are used so often as to render it advisable to have them directly available to the program rather than having to access them in memory, in order to cut down processing time and complexity of programming. Such registers may contain factors utilized in processing data (such as multiplicands used in digital filtering of the data and the like) and information relating to the particular engine under test (such as number of strokes and cylinders) which may be entered by switches manipulated by an operator, the switches feeding binary decode circuits such that the decode constantly reflects the position of the switch on a steady state basis in the manner of a register.

The remainder of FIG. 1 is illustrative of one type of data processing apparatus, which is shown for illustrative purposes herein since it is a type that may be advantageous for use where general purpose programming is not required, but rather limited functions are to be performed. A computer, as is known in the art, includes memory (or accessible storage), and arithmetic unit, program control, and the necessary gates, data flow and event decode or monitoring circuits so as to permit advancing logically through the steps which are to be performed. Specifically, a memory 24 may be loaded from a variety of inputs shown on the data flow under control of a memory multiplexer 25 which is enabled and addressed by the program so as to select which of the possible inputs to memory are to be applied thereto, if any. The memory 24 is responsive to a memory address register 26 which may respond to a counter used in program control in a usual fashion. The output of the memory is available to other portions of the data flow, such as print and display apparatus 27 and the arithmetic apparatus including arithmetic unit input registers, referred to herein as an A register 30 and a B register 31 under control of register gates 32 which are controlled by the program in a known fashion. Herein, the output of the A register and the B register is available to the register gates 32 and to the main data flow, so that their contents may be moved between the registers 30, 31 or to the memory 24. This is to facilitate the particular type of processing which may be employed in an engine diagnostic system, as is described more fully hereinafter. The registers 30, 31 feed an arithmetic unit of a known type 35, the function of which, controlled by the program, is to add, subtract, multiply or divide, to provide answers to a result register 36 as well as providing indications of the sign of the result. As indicated in FIG. 1, the result register may be available at the input to the arithmetic unit through the gates 32; alternatively, as is common in many computers the result register could be automatically one of the inputs to the arithmetic unit, and it can be loaded directly from the memory upon a proper command.

In order to provide data inputs to the memory for initialization and to permit a degree of control over the system during processing, a keyboard 38 of a usual variety may be provided. In addition to data inputs, the keyboard may have control function keys that permit choice to the operator of loading memory from the result register or of loading memory in response to the keyboard, depending upon conditions which may be displayed in the print and display apparatus 27.

For the rather limited number of tests being performed in apparatus incorporating the present invention, the program may be controlled in a variety of ways. One way is a program ROM 40 which provides input gate addresses to control the inputs to the memory, the arithmetic input registers, and the A/D converter, etc.; the memory address; the functions to be performed by the arithmetic unit, and other commands such as commands to the memory to cause it to read or write, and to start the A/D converter 11, and the like. Sequencing is controlled by unconditional branch instructions (which provide a branch address) and by skip instructions (dependent on conditions) provide I to a branch/skip control 42 at the input to the program counter 44, which is also responsive to system clocks 46. Thus, as is known, for each program clock signal received from the system clocks, the program counter may be advanced, skipped once or twice, or reset to the branch address, in dependence upon the presence of branch or skip instructions.

It should be understood that the particular processing apparatus used, and the degree of use of special purpose apparatus, is dependent upon the particular implementation of the present invention which is to be made, and forms no part of the present invention. If the invention is utilized in a complex, sophisticated diagnostic system in which a variety of diagnostic functions are required, then the type of apparatus selected for processing may be more sophisticated and capable of general purpose utilization in order to accommodate the special requirements of all of the diagnostic procedures to be performed. However, the cost of programming complexity of such a processing system may be unwarranted in a diagnostic system which performs either relatively few or relatively simple tests. As is more apparent in the light of detailed operational descriptions hereinafter, well known processing systems (such as NOVA and PDP/11) employing only programs provided through techniques well known in the art, may be utilized in conjunction with the engine sensors and conditions 10, suitable input and output apparatus (such as the keyboard 38 and the print and display apparatus 27) and, depending on the processing power of the data processing system selected, some special purpose hardware which may be found advisable, such as the tooth timer 15, the tooth counter 20 and some special registers 22. However, the well known processing systems referred to hereinbefore can provide adequate memory capacity to perform the tooth timing and counting functions, and to provide for the storage of all required parameters and engines information in the memory, as is readily apparent to those skilled in the art.

Figure 2:
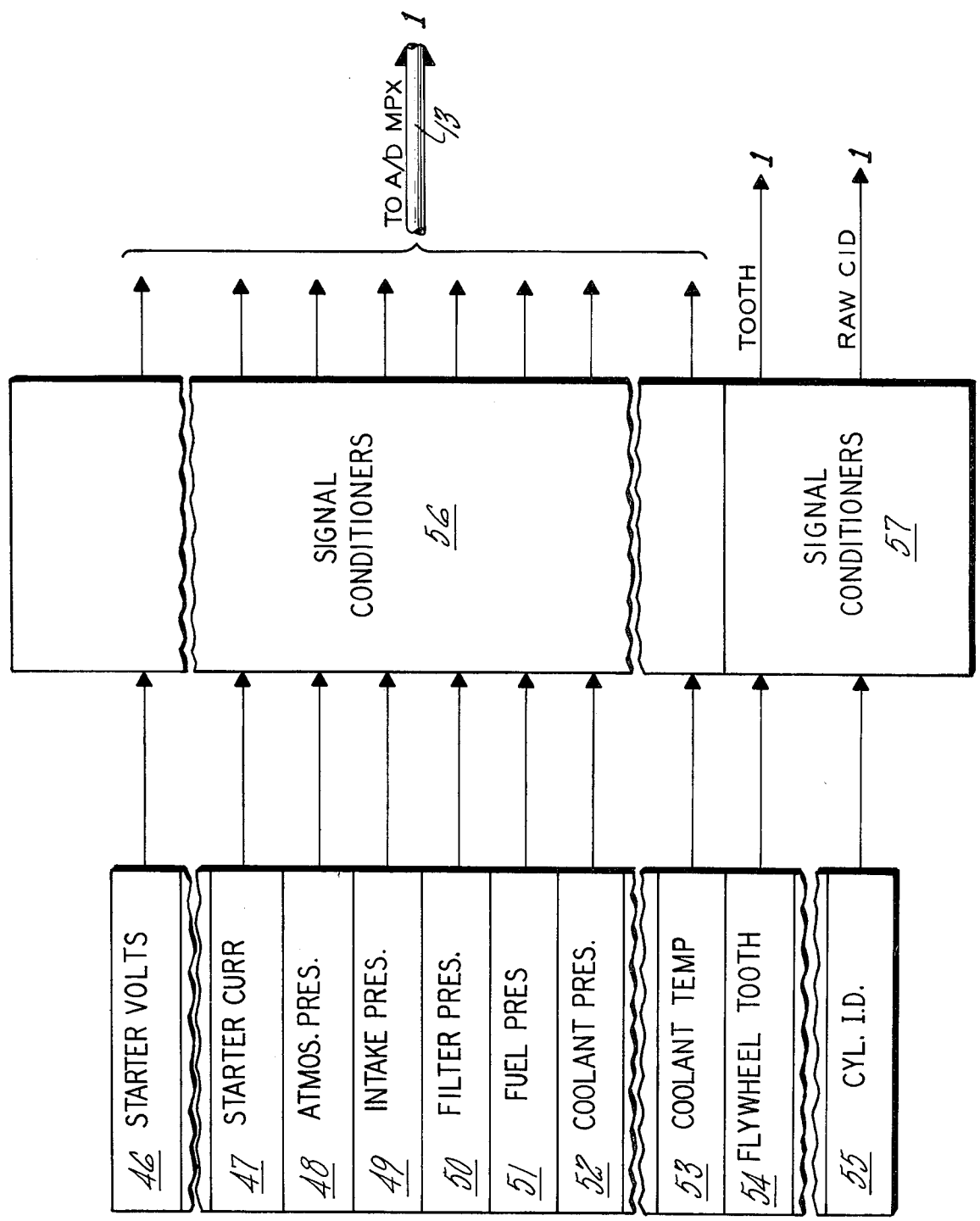
FIG. 2 is a simplified block diagram of engine parameter sensing apparatus for use in the embodiment of FIG. 1.

Referring now to FIG. 2, a plurality of engine sensors in a diagnostic system incorporating the present invention may include, among others not shown in FIG. 2, a starter voltage probe or clamp 46, a starter current probe 47, an atmospheric pressure transducer 48, which could be disposed in general proximity to the engine under test, a pressure transducer 49 to measure the intake manifold air pressure, a filter pressure transducer 50 to measure the pressure of the fuel downstream of the fuel inlet filter, a fuel pressure transducer 51 to measure the pressure at the fuel injector inlet rail of the engine, a coolant transducer 52 which may preferably measure the pressure of coolant at the inlet to the coolant thermostat, a coolant temperature transducer 53 to measure coolant temperature, preferably at the inlet to the thermostat. In a diagnostic system incorporating the present invention there may also be a proximity sensor 54, which may comprise an RGT Model 3010-AN Magnetic Proximity Sensor, provided by Electro Corporation, Sarasota, Fla., for sensing the passage of flywheel teeth past a particular point adjacent to the flywheel housing, and a proximity sensor 55 such as a Model 4947 Proximity Switch distributed by Electro Corporation, for sensing the presence of an engine member which moves in a unique fashion once in each cycle of the engine, which is one revolution in a two stroke engine or two revolutions in a four stroke engine. The proximity sensor 55 may preferably be mounted through the valve cover adjacent to a rocker arm related to the intake valve of one of the cylinders of the engine, thereby to provide information as to the particular point of an engine cycle once in each cycle, as well as to delineate successive engine cycles as the engine is rotating.

Each of the sensors of FIG. 2 is applied to a suitable one of a plurality of signal conditioners 56, 57 to filter out unwanted noise, and to provide, through an amplifier, suitable level adjusting as is appropriate for the circuitry being fed thereby. For instance, the signal conditioners 56 scale the signals to the proper level so that each of them can be fed through a common A/D converter 12 (FIG. 1). The signal conditioners 56, 57 can be suitable ones of a wide variety known in the art, and form no part of the present invention.

Figure 3:
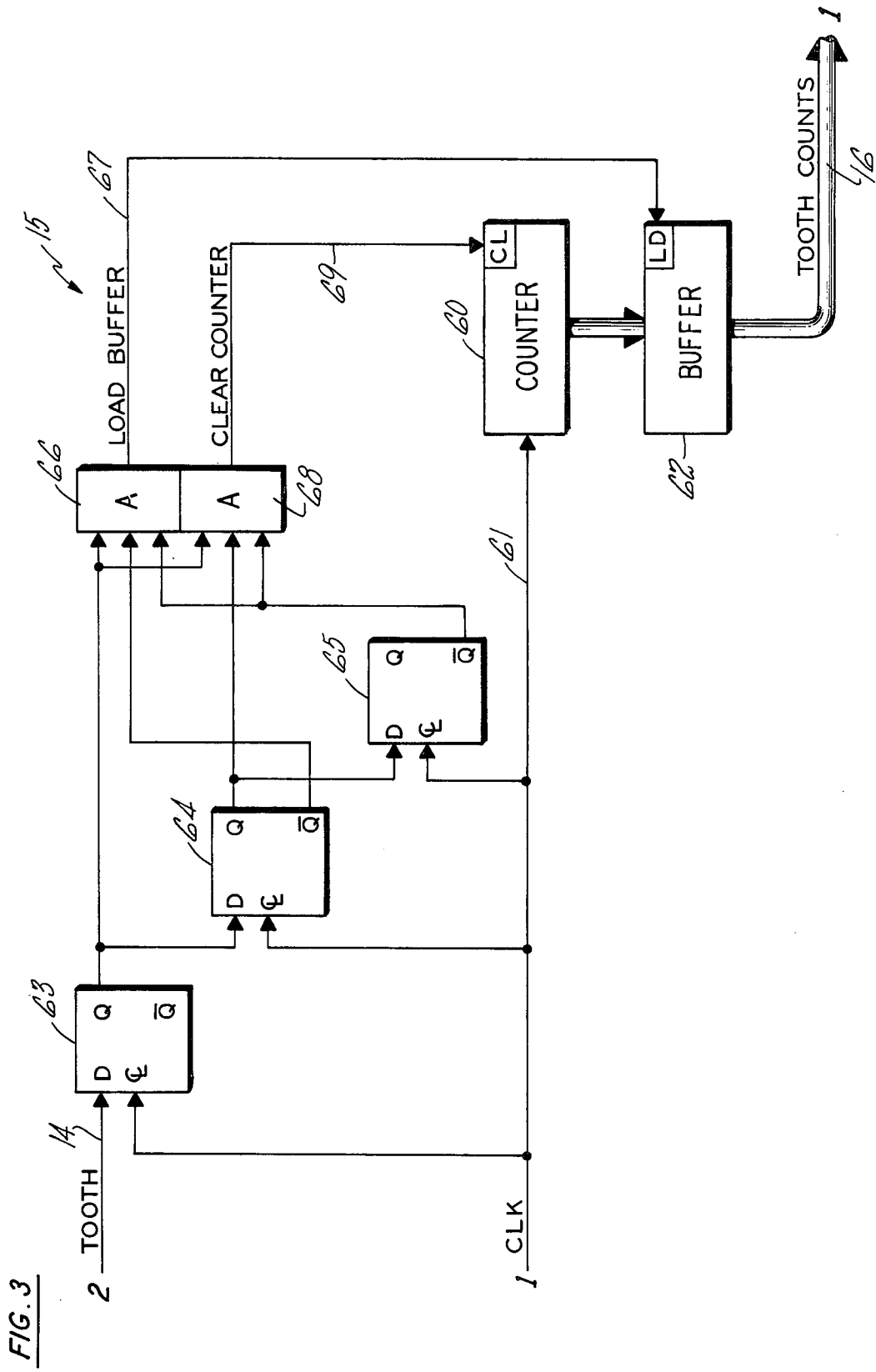
FIG. 3 is a simplified schematic diagram of tooth timer means for obtaining instantaneous, sub-cyclic engine speed in the embodiment of FIG. 1.

Referring now to FIG. 3, the tooth timer 15 includes a counter 60 which repetitively counts clock pulses on a line 61 that may be supplied by system clocks 46 in FIG. 1. The counter is parallel-fed to a buffer 62, the output of which comprises the tooth counts. The counter is running substantially all of the time since a very high frequency clock signal can be utilized on the line 61 (anywhere from tens of KHz to tens of MHz) whereas at speeds from 300 rpm to 2,000 rpm the frequency of the tooth signals on the line 14 may be on the order of 10 Hz to 100 Hz, depending upon the number of teeth. Thus the few clock signals lost during the tooth to tooth resetting of the counter are miniscule.

Each time that a tooth signal appears on the line 14, the next clock signal will set a D-type flip flop 63, the Q output of which is applied to a D-type flip flop 64. The second clock signal following the tooth signal therefore sets the D-type flip flop 64, and since its Q output is applied to a D-type flip flop 65 the third clock signal will cause it to become set. The very first clock signal, after the appearance of the tooth signal, is decoded by an AND circuit 66 since it responds to Q of flip flop 63 and not Q of flip flop 64 and 65; this provides a load buffer signal on a line 67 to cause the buffer 62 to be loaded in parallel from the counter 60. The second clock signal following the appearance of the tooth signal will cause an AND circuit 68 to respond to the Q of flip flops 63 and 64 and the not Q of flip flop 65 so as to generate a clear counter signal on a line 69 which is applied to the clear input of the counter 60 causing it to be cleared to zero. The third clock signal, by setting the flip flop 65, simply eliminates the clear counter signal on the line 69 so that the next leading edge of the clock signal and all subsequent clock signals will be counted in the counter 60. Whenever the tooth signal disappears, (which is totally immaterial) the next three clock signals in a row will cause resetting of the flip flops 63–65, in turn, since each of their D inputs will go down. The counter and the buffer are independent of the resetting of the flip flops 63–65 since both AND circuits 66, 68 operate only during a progression with flip flop 63 on and flip flop 65 off, which does not occur during the resetting of the flip flops.

Thus the tooth timer 15 provides tooth counts on the line 16 which are stable, throughout substantially each intertooth interval. The processing apparatus of FIG. 1 may therefore sample the tooth counts at random. The tooth timer 15 thereby provides very accurate, subcyclic speed measurement, on a tooth to tooth basis, which provides speed indications many times within each individual cylinder stroke portion of each engine cycle.

In the detailed description of exemplary processing hereinafter, the term "ringgear" is sometimes used in place of "flywheel"; they mean the same thing; the abbreviation "RGT" means "ringgear teeth," a stored factor indicating the number of teeth on the flywheel of the engine under test. This may be determined and entered from engine specifications, or as set forth in a commonly owned copending application of Stick et al., Ser. No. 684,037, entitled "Determination of Number of Teeth on an Internal Combustion Engine Flywheel." Other abbreviations include "RSLT" = result register; "MEM" = memory; "CTR" = counter; "Factor" means a memory location or a register where the factor is available; "CMPLT" means A/D conversion is completed; "spd" means speed; and other abbreviations are apparent in the drawing. Parentheticals after "MEM," such as "(Freq)", indicate addresses, chosen at will by the programmer, or partially determined by counter two, if so indicated.

The exemplary system herein is designed for four-stroke, six-cylinder engines. If desired, the programming may be altered to compare counts (particularly counter two) with loaded indications of engine variables, such as cylinders, in a well known fashion.

The present invention utilizes the ratio of a single tooth to the total number of teeth in the flywheel as an indication of the relationship between elapsed time measured by the tooth timer to the speed of the engine. Therefore, it is necesary to know the number of teeth in the flywheel of the engine. The number of teeth in the flywheel may be entered by an operator in response to known specifications about the engine under test. This may be accomplished by means of a load routine transferring data from the keyboard 38 to a particular, known location in memory 24 or to special purpose registers, such as registers 22. On the other hand, switches may be utilized to indicate the number of teeth, the switch indication being encoded into a binary fashion and the combination being the equivalent of a operator controlled register so as to supply the number of teeth. Or, if desired, the number of teeth can be determined by the diagnostic system itself in accordance with the teachings of the aforementioned copending application of Stick et al. In any event, the determination of the number of teeth in the flywheel is not part of the present invention, and can be accomplished in the foregoing or other ways found suitable in any given implementation of the present invention.

As contemplated herein, speed may be called for by the processing apparatus of FIG. 1 whenever it is required in any routine. As described in the aforementioned copending application of Willenbecher et al., there may be a need to determine speed on a rather rapid basis. That is, it may be desirable to know the speed accurately in relation to some other event (such as starting a timer as in the Willenbecher et al. application). Therefore, it may be advisable to prepare in advance for speed measurements.

In order to determine whether or not the number of ringgear teeth have been known, so as to call into operation a routine for determining the number of teeth in the flywheel, a preliminary subroutine may be utilized as follows:
1. Reset A and B REGS
2. Load MEM RGT to B REG
3. Subtract
4. Skip one if negative
5. Branch to RGT Routine When the counting of teeth is accomplished by the routine, it can branch back to predigest some of the factors involved in determining speed from the tooth timer. By the relationship that each tooth is a fraction of a revolution determined by the number of teeth on the flywheel, and the elapsed time for each tooth is determined by the number of counts counted on a tooth-to-tooth basis divided by the frequency of the clock feeding the tooth timer, the speed is one tooth divided by the total number of teeth, all of which is divided by the ratio of the number of counts to the frequency. Alternatively, speed (in seconds) is the clock frequency divided by the total number of teeth times the counts, when the clock frequency is expressed in Hz. To get speed to be expressed in revolutions per minute, the speed in seconds must be multiplied by 60, as is known. Therefore, a factor of 60 times the clock frequency divided by the total number of teeth can be prepared, and any time speed is required, that factor can be divided by the counts of the interval timer to provide speed in rpm's very rapidly.

As an example, consider a 10 MHz clock, with a flywheel having on the order of 100 teeth, a speed of 1000 rpm (just above low idle in most diesel engines) would result in a tooth timer count of approximately 6000. And, the relationship is linear.

An exemplary process for precalculation of the factor which, when divided by counts, will result in speed in rpm's may be in accordance with the following instructions:
6. Load MEM (Freq.) to A REG
7. Load MEM (RGT) to B REG
8. Divide
9. Load RSLT to A REG
10. Load 60 Factor to B REG
11. Multiply
12. Load RSLT to MEM (Spd)

And, when speed is actually desired, very little processing is required as indicated by the following exemplary instructions:
13. Load MEM (Spd) to A REG
14. Load Tooth timer to B REG
15. Divide
16. Load RSLT to MEM (where desired)

The particular manner of using this speed indication is not part of the present invention. However, it may be used in any fashion in which tachometer indications are known to be used in the prior art, and also will find utility in a much larger number of cases because of its usefulness in instantaneously providing indications of speed, many times in each revolution of the engine.

It should be understood that the particular data processing apparatus utilized in a diagnostic system incorporating the present invention, and more specifically the programming steps which may be used in a programmable version of data processing apparatus in a diagnostic system incorporating the present invention, form no part of the present invention. Further, the particular method of processing the data in order to determine speed, of which the foregoing is but an example, is readily adaptable to a wide variety of multipurpose data processing apparatus, as well as special purpose apparatus which is designed strictly for that function. Obviously, if desired in any given implementation of the present invention, special purpose apparatus of either a digital or an analog variety may be utilized to determine speed, to provide speed outputs directly, within the purview of the invention. Similarly, although the invention has been shown and described with respect to an exemplary embodiment thereof, it should be understood by those skilled in the art that the foregoing and various other changes, omissions and additions may be made therein and thereto without departing from the spirit and the scope of the invention.

Having thus described a typical embodiment of our invention, that which we claim as new and desired to secure by Letters Patent is:

1. Apparatus for sub-cyclic determination of speed of a rotating internal combustion engine, comprising:
   means adapted to be disposed on the engine for sensing the passage of teeth on the flywheel of said engine, said teeth delineating successive, substantially equal small angles, each of which is a small fraction of a full revolution of the engine, and providing a sense signal in response to an integral number of the teeth;

timing means responsive to said sensing means for providing a time increment data manifestation of the elapsed time between occurrences of said sense signals from said sensing means;

means presenting a manifestation of the number of teeth on said flywheel; and processing means reponsive to said angle data manifestation and to said time increment manifestation for generating a manifestation of the speed of the engine.

2. Apparatus for sub-cycle sensing of speed of a rotating internal engine, comprising:

tooth sensing means adapted to be disposed in proximity with the teeth on the flywheel of the engine for providing a tooth signal in response to the passage thereby of each successive tooth on the flywheel of the engine as the engine rotates;

a source of clock signals having a frequency very much greater than any frequency of the passage of teeth anticipated at the highest angular speed of the engine;

counting means connected for response to said source of clock signals and to said tooth sensing means for accumulating clock signals from said source of clock signals for time intervals delineated by integral numbers of successive ones of said signals from said tooth sensing means;

means registering an indication of the number of teeth on the flywheel of the engine; and processing means responsive to said registering means and to said counting means for computing the speed of said engine as a ratio of said integral number to the number of teeth on the flywheel as indicated by said registering means, multiplied by the ratio of the count accumulated in said counter to the frequency of clock signals of said source.

3. Apparatus according to claim 2 wherein said tooth sensing means comprises a metallic proximity sensor adapted to be disposed through the flywheel housing of the engine in a manner to sense the passage of teeth thereby.

4. In the method of sensing the speed of a rotating internal combustion engine on a sub-cycle basis, the steps of:

sensing the passage of an integral number of teeth disposed on the flywheel of the engine;

measuring the time interval between the sensing of teeth; and providing a measure of speed as the ratio of said integral number to the total number to teeth on said flywheel times the reciprocal of the elapsed time measured.

5. In the method of sensing the speed of a rotating internal combustion engine on a sub-cycle basis, the steps of:

sensing the passage of teeth on the flywheel of the engine and successively providing a signal in response to the passage of an integer number thereof;

accumulating clock signals having a frequency very much greater than the tooth frequency of the flywheel at the highest speed of the engine between successive ones of said signals; and providing a measure of engine speed as the ratio of said integral number to the number of teeth on the flywheel multiplied by the ratio of the count of clock signals accumulated to the frequency of clock signals.

* * * * *

UNITED STATES PATENT AND TRADEMARK OFFICE
CERTIFICATE OF CORRECTION

PATENT NO. : 4,055,993
DATED : November 1, 1977
INVENTOR(S) : Richard J. Rackliffe; Lee R. Armstrong It is certified that error appears in the above-identified patent and that said Letters Patent are hereby corrected as shown below:

| | |
|---|---|
| Column 1, line 52 | "when" should read --which-- |
| Column 4, line 54 | "provide I to" should read --provided to-- |
| Column 5, line 13 | "conditions" should read --conditioners-- |
| Column 5, line 24 | "engines" should read --engine-- |
| Column 5, line 37 | After "coolant" insert --pressure-- |
| Column 6, line 66 | "CTR" should read --"Ctr"-- |
| Column 8, line 62 | "desired" should read --desire-- |
| Column 9, line 16 | After "internal" insert --combustion-- |

Signed and Sealed this

Fourth Day of July 1978

[SEAL]

Attest:

RUTH C. MASON
*Attesting Officer*

DONALD W. BANNER
*Commissioner of Patents and Trademarks*

UNITED STATES PATENT AND TRADEMARK OFFICE
CERTIFICATE OF CORRECTION

PATENT NO. : 4,055,993
DATED : November 1, 1977
INVENTOR(S) : Richard J. Rackliffe, Lee R. Armstrong It is certified that error appears in the above-identified patent and that said Letters Patent are hereby corrected as shown below:

Column 9, lines 11 and 12    "angle data manifestation" should read -- manifestation of the number of teeth on said flywheel --

Signed and Sealed this

Thirtieth Day of October 1979

[SEAL]

Attest:

RUTH C. MASON
Attesting Officer

LUTRELLE F. PARKER
Acting Commissioner of Patents and Trademarks